(12) United States Patent
Denoual et al.

(10) Patent No.: US 7,647,549 B2
(45) Date of Patent: Jan. 12, 2010

(54) METHOD AND DEVICE FOR PROCESSING A REQUEST FOR OBTAINING MULTIMEDIA DATA

(75) Inventors: Franck Denoual, St Domineuc (FR); Gildas Cotten, Balaze (FR); Lilian Labelle, St Samson S/Rance (FR)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 10/281,151

(22) Filed: Oct. 28, 2002

(65) Prior Publication Data

US 2003/0083755 A1 May 1, 2003

(30) Foreign Application Priority Data

Oct. 30, 2001 (FR) .................................. 01 14093

(51) Int. Cl.
*G06N 3/00* (2006.01)
(52) U.S. Cl. ...................................... 715/200
(58) Field of Classification Search ................ 715/500, 715/517, 513, 523, 530, 234, 243, 254, 255, 715/200
See application file for complete search history.

(56) References Cited

U.S. PATENT DOCUMENTS

| | | | | |
|---|---|---|---|---|
| 5,379,298 | A * | 1/1995 | Saiki et al. .................. | 370/252 |
| 6,351,747 | B1 * | 2/2002 | Urazov et al. ................. | 707/10 |
| 6,880,123 | B1 * | 4/2005 | Landsman et al. ....... | 715/500.1 |
| 2002/0133627 | A1 * | 9/2002 | Maes et al. ................. | 709/246 |

FOREIGN PATENT DOCUMENTS

EP 1 122 654 A2 8/2001
WO WO 01/63481 A2 8/2001

OTHER PUBLICATIONS

"Information technology—Generic coding of audio-visual objects—part 2: Visual Amendment 1: Visual extensions," ISO/IEC JTC 1/SC 29/WG 11 N 3056, Maui, Dec. 1999.
"Adapting to Network and Client Variation Using Infrastructural Proxies: Lessons and Perspectives," A. Fox, et al., IEEE Personal Communications, vol. 5, No. 4, pp. 10-19, Aug. 1998.

(Continued)

*Primary Examiner*—Kyle R Stork
(74) *Attorney, Agent, or Firm*—Fitzpatrick, Cella, Harper & Scinto

(57) ABSTRACT

The invention concerns a method of processing a request for obtaining multimedia digital data, said request having a number of descriptors characterizing it, characterized in that said method has the following steps:

analysis of the descriptors characterizing the request being processed;

comparison of the result of the analysis with the descriptors of other requests processed earlier;

according to the result of the comparison, a decision as regards knowing whether the request being processed is:

identical to a request processed earlier, in the sense that the two requests have the same request descriptors;

similar to a request processed earlier, in the sense that the two requests have at least one request descriptor in common;

new compared with the requests processed earlier.

33 Claims, 11 Drawing Sheets

OTHER PUBLICATIONS

"Adapting Multimedia Internet Content for Universal Access," R. Mohan, et al., IEEE Transactions on Multimedia, vol. 1, No. 1, pp. 104-114, Mar. 1999.

"Semantic Cache Mechanism for Heterogenous Web Querying," B. Chidlovskii, et al., Computer Networks, vol. 31, No. 11-16, pp. 1347-1360, May 1999.

"A Framework for Adaptive Content Delivery in Heterogenous Network Enviroments," W. Ma, et al., SPIE vol. 3969, pp. 86-100, Jan. 2000.

"Transcoding: Extending E-Business to New Environments," K. Britton, et al., IBM Systems Journal, vol. 40, No. 1, pp. 153-178, Sep. 2001.

* cited by examiner

METHOD AND DEVICE FOR PROCESSING A REQUEST FOR OBTAINING MULTIMEDIA DATA

The present invention concerns a method of processing a request for obtaining multimedia digital data.

The technological progress of digital communication appliances such as televisions, pocket microcomputers, conventional microcomputers or any other miniaturized appliance is such that, in the years to come, it will very probably be possible to exchange multimedia type data and, for example, audio and/or video type data between these different appliances.

Market surveys show, furthermore, that users are prepared to purchase such communication appliances provided that the price is not too excessive and, above all, that the services given are of good quality.

Following the identification of this new market, many studies have been carried out concerning the miniaturization of electronic components, so as to obtain appliances having high memory and calculating capacities.

Moreover, many standardization bodies have put in place standards allowing standardization of data exchanges between these appliances with different characteristics. These standards, such as those of the IEEE 802 family, allow both implementation and management of the transfer of data via a particular network.

The IEEE 802.11 standard and its European equivalent Hyperlan are dedicated to local wireless networks. These are being particularly investigated at present since they are broadband networks making it possible to transmit audio and/or video data between two machines that are geographically close.

These standards are therefore particularly adapted for developing local wireless networks inside homes.

The technical solutions being investigated at present within the context of the above-mentioned standards applied to domestic local networks make it possible to transmit digital data either between a machine referred to as the server and a machine referred to as the client (point-to-point transmission), or between the server and a group of clients, or between the server and a number of clients (multipoint communication), with no wiring.

In this environment, the data are stored on the server which centralizes all communications with the client or clients. This server can also serve as a gateway with the outside world (the Internet, television, video camera, etc.).

It should be noted that domestic local networks can be of a heterogeneous nature, that is to say they can, for example, consist partly of wireless links and partly of wired links.

Although many projects are investigating the implementation of services around interactive television and the exchange of information over the Internet, few of them are dealing with problems connected with the implementation of domestic local networks, namely the putting in place of solutions enabling an acceptable quality of service to be obtained.

With the server being connected to the outside world, the stored data are of varied sizes. The transportation of these data through a local network is therefore not an easy service to put in place.

Furthermore, when a first communication appliance, acting as a server, has to process a request for obtaining multimedia data coming from a second appliance connected to the first appliance through a communication network which is not necessarily a local network, the problem arises of the time for processing this request in order to respond to the second appliance.

This processing time can become all the greater as the data requested in a request are increasingly adapted according to different parameters or descriptors that characterize this request.

Among these descriptors, there are:

the characteristics of the transmission network (passband, error rate, transmission delay, etc.);

information relating to the requested content (audio, video, compression format used, etc.);

the preferences of the user who issued the request (type of presentation, resolution, video timing, number of colors, waiting time, etc.);

certain characteristics of the second communication appliance such as the size of the display screen of the appliance and the color depth this appliance can support.

Thus, according to the request formulated by the user, the time for processing said request can vary considerably and be relatively long, and perhaps even, in certain cases, bring about a response time unacceptable to the user.

A communication system is known from the article "Adapting multimedia Internet content for Universal Access" by R. Mohan, J. Smith, C-S. Li, IEEE Transactions on Multimedia, March 1999, which makes provision for building a database listing the different categories of communication appliances which can be connected to a server.

For each category of appliance, the system takes into account the size of the display screen of this category of appliance and the color depth the appliance can support (the number of bits per color component) and keeps them in memory.

When, in a request coming from one of the appliances and aimed at obtaining video data, the system recognizes the above-mentioned characteristics of this appliance, then the system knows at once which coding algorithm or algorithms to use for adapting the data coding to these characteristics.

Another communication system is also known from the article entitled "A framework for adaptive content delivery in heterogeneous network environments" by W. Y. Ma et al., published in Multimedia Computing and Networking 2000, January 2000.

In this system, provision is made to adapt the content of Web pages consulted over the Internet by a user according to the preferences of the user for the display of these pages.

The systems identified above are not entirely satisfactory as regards the time for processing a request issued by a user and aimed at obtaining multimedia digital data.

It would in fact be advantageous to improve this processing time in order to shorten the time necessary for supplying the response expected by the user.

The object of the present invention is thus a method of processing a request for obtaining multimedia digital data, said request having a number of descriptors characterizing it, characterized in that said method has the following steps:

analysis of the descriptors characterizing the request being processed;

comparison of the result of the analysis with the descriptors of other requests processed earlier;

according to the result of the comparison, a decision as regards knowing whether the request being processed is:

identical to a request processed earlier, in the sense that the two requests have the same request descriptors;

similar to a request processed earlier, in the sense that the two requests have at least one request descriptor in common;

new compared with the requests processed earlier.

Correlatively, the object of the invention is also a device for processing a request for obtaining multimedia digital data, said request having a number of descriptors characterizing it, characterized in that said device has:

means of analyzing the descriptors characterizing the request being processed;

means of comparing the result of the analysis with the descriptors of other requests processed earlier;

means of deciding, according to the result of the comparison, as regards knowing whether the request being processed is:

identical to a request processed earlier, in the sense that the two requests have the same request descriptors;

similar to a request processed earlier, in the sense that the two requests have at least one request descriptor in common;

new compared with the requests processed earlier.

By determining whether the request being processed is identical, similar or new compared with the requests processed earlier, the invention makes it possible to quickly take a decision on the processing to be performed in order to respond to the request issued by a user.

For example, if the current request is identical to an already processed earlier request, the processing of this request will be speeded up since the coding parameter or parameters necessary for adapting the data to the request of the user will already have been determined earlier and will therefore already be available.

Similarly, if the current request is similar to an already processed earlier request, a non-negligible amount of work will already have been performed earlier and the results of this work which will already be available will enable the processing of the current request to be speeded up.

It should be noted that, when the current request and a request processed earlier have certain request descriptors in common, but not all those of the current request, then the latter is also considered to be similar to the earlier request.

Thus, when such a current request has been identified at the above-mentioned decision step, this makes it possible to reduce still further the time for processing this request compared with the case where a single request descriptor is common between the current request and the earlier request.

This is because the task remaining to be carried out for adapting the requested data to the request descriptor or descriptors not common with the earlier request will be smaller since the request descriptors in common are more numerous this time and therefore the adaptation work performed earlier and already available will be greater.

In fact, the operations carried out earlier for adapting data to a number of request descriptors, like for example the content of the data and characteristics of the client machine the user has at their disposal, occasion a greater amount of work than for a single request descriptor and the result of these operations is available for the processing of the current request.

According to a first case, when the request being processed is considered similar to an earlier request, the method includes a step of taking into account at least one coding parameter which will be used for coding the data and which has already been determined earlier according to said at least one request descriptor in common with the earlier request.

Thus, the aforementioned coding parameter or parameters can be made use of without needing to recalculate them.

According to one characteristic, when the request being processed is considered similar to a processed earlier request, the method includes a step of determining at least one so-called coding parameter which will be used for coding the data, said at least one coding parameter being determined according to at least one descriptor characterizing the request being processed and which is not in common with the earlier request.

In this way, the operations for determining this coding parameter or these coding parameters occasion less processing than in the case where the request descriptor or descriptors in common must also be taken into account, for the calculation.

According to a second case, when the request being processed is considered identical to an earlier request, the method includes a step of taking into account at least one coding parameter which will be used for coding the data and which has already been determined earlier according to at least certain of the descriptors characterizing the request being processed.

This makes it possible to reuse the results of the operations of the determination of the coding parameters performed earlier for the already processed earlier request.

According to one characteristic, the method includes a step of determining as regards knowing whether the current request has a frequency of appearance which is above a predetermined threshold.

By monitoring this criterion, it is possible to identify the requests which are the most frequent.

To that end, it should be noted that it is also possible to monitor the least frequent requests, perhaps even delete certain of these requests which appear only little or not at all during a reference period.

Here also, it can be monitored whether the frequency of appearance is below a predetermined threshold, during a reference period.

Deletion of the least frequent requests makes it possible to reduce the memory capacity where the earlier requests are stored.

According to another characteristic, when the frequency of appearance of the current request is above the predetermined threshold, the method includes a subsequent step of storing the coded data with said at least one coding parameter determined earlier.

Thus, for the most frequent requests, the processing time is reduced still further since the adapted content of the coded data is stored and therefore available very quickly in the event of identification of an identical request.

According to a third case, when the request being processed is considered to be new, the method includes a step of determining at least one coding parameter which will be used for coding the data, said at least one coding parameter being determined according to at least one descriptor characterizing the current request.

As soon as the current request is neither identical nor similar to an already processed earlier request, it is considered to be new.

The fact of having made provision for two other cases before considering that a request is new makes it possible to save processing time since all the work of adapting the coding parameter or parameters to the descriptors of the request is performed less systematically than if only two cases, a new or identical request, were considered.

According to one characteristic, the analysis, comparison and decision steps are performed in a first communication appliance connected to a second communication appliance by a communication network.

A descriptor of the current request comprises for example:

at least certain of the characteristics of the second communication appliance, namely, for example, the calculating capacity of this appliance, its memory capacity, etc.; or at least certain of the characteristics of the communication network.

A descriptor of the current request can also identify the multimedia data to be supplied to the second communication appliance.

A descriptor of the current request can furthermore specify the preferences of the user who issued the request in terms of presentation or format of the data.

According to one characteristic, the request is considered to be similar to an earlier request when the multimedia data requested in the request being processed and at least one other request descriptor are taken into account as common request descriptors.

Thus, by taking into account as request descriptors the content of the data and at least one other descriptor such as, for example, characteristics of the second communication appliance, more time is saved in the processing than in the case where, for example, only characteristics of the second appliance are taken into account.

The invention also concerns a communication appliance having a device as briefly described above.

According to another aspect, the invention also relates to:
an information storage means readable by a computer or a microprocessor having code instructions of a computer program for executing steps of the method according to the invention such as the one briefly described above, and
an information storage means that is removable, partially or totally, readable by a computer or a microprocessor having code instructions of a computer program for executing steps of the method according to the invention such as the one briefly described above.

According to yet another aspect, the invention relates to a computer program that can be loaded into a programmable appliance, having sequences of instructions or portions of software code for implementing steps of the method according to the invention as briefly described above, when said computer program is loaded and executed on the programmable appliance.

As the characteristics and advantages relating to the device, to the communication appliance having such a device, to the information storage means and to the computer program are the same as those described above concerning the method according to the invention, they will not be repeated here.

Other characteristics and advantages of the present invention will emerge more clearly from a reading of the following description, given with reference to the accompanying drawings, in which.

Figure 1:
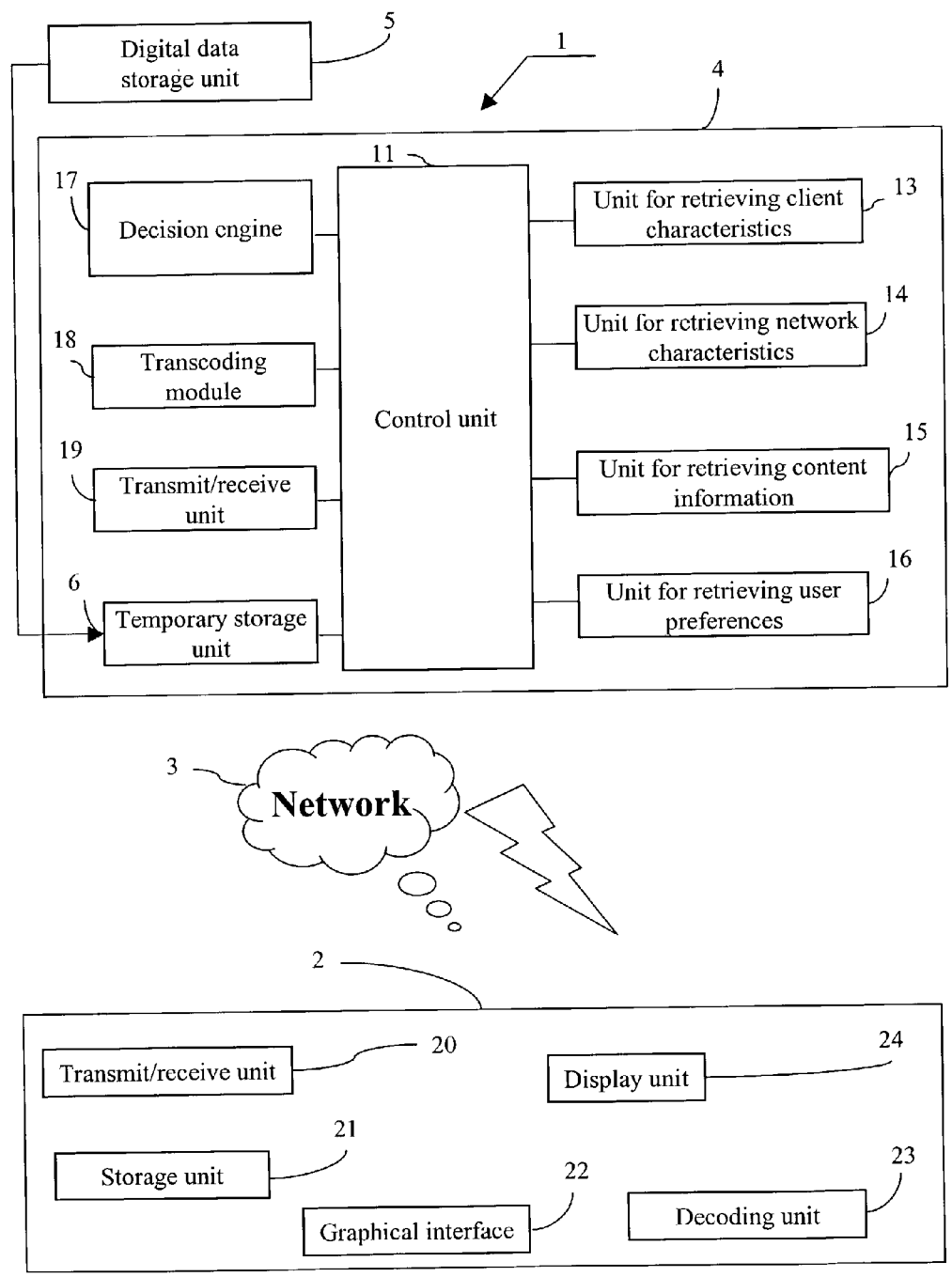
FIG. 1 depicts schematically a client/server type communication architecture in which the invention can be implemented.
Figure 3A:
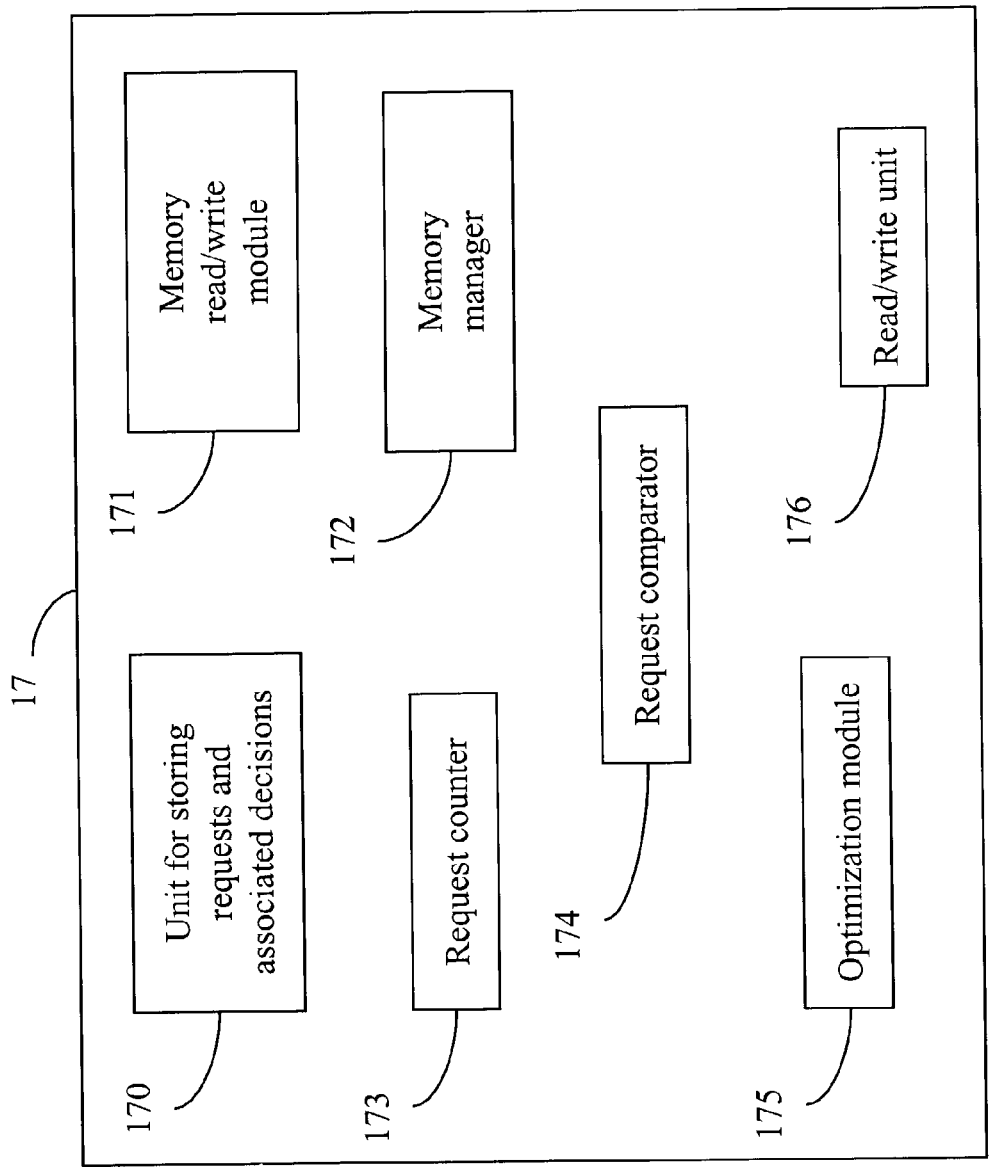
Figure 3B:
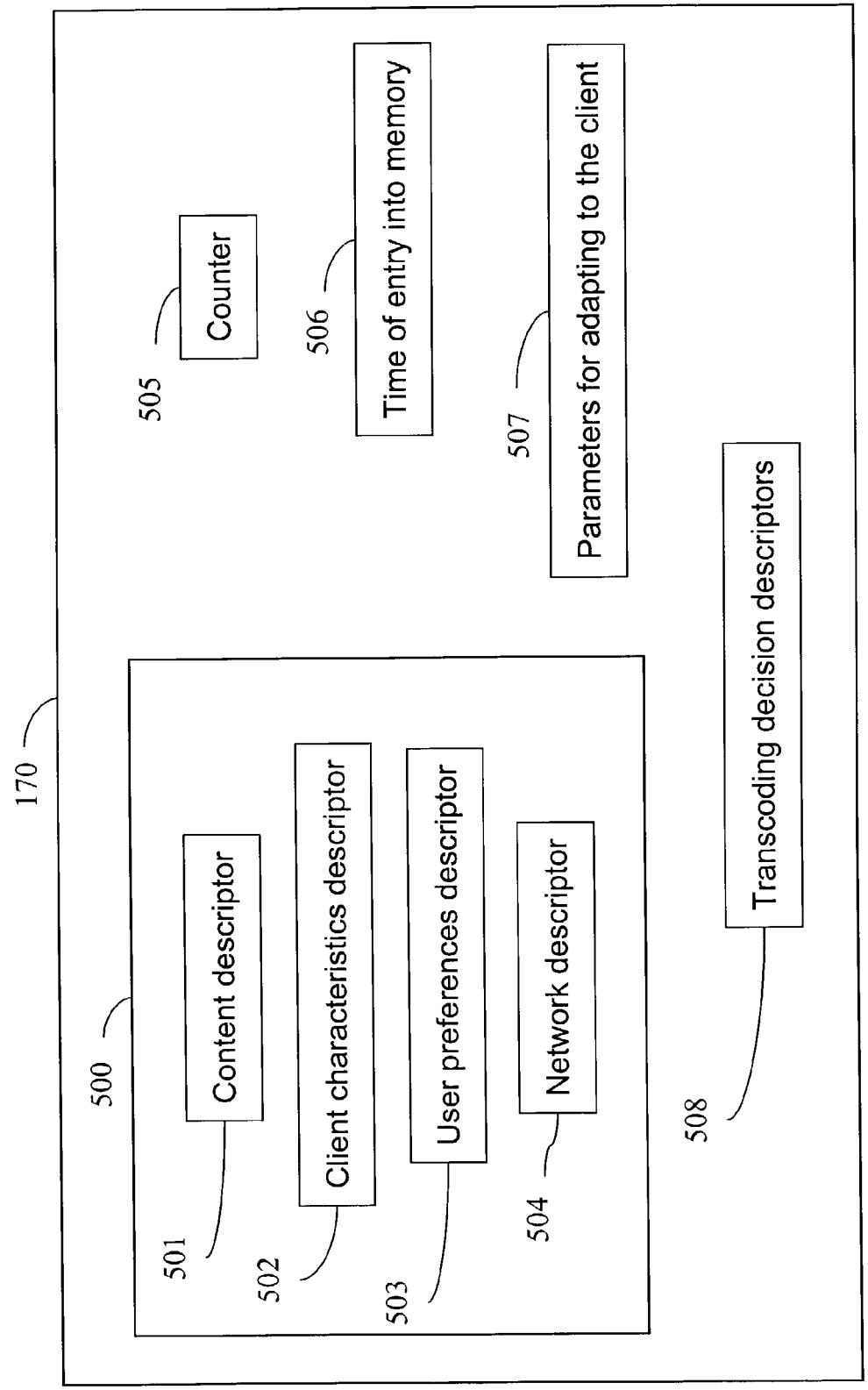
Figure 3C:
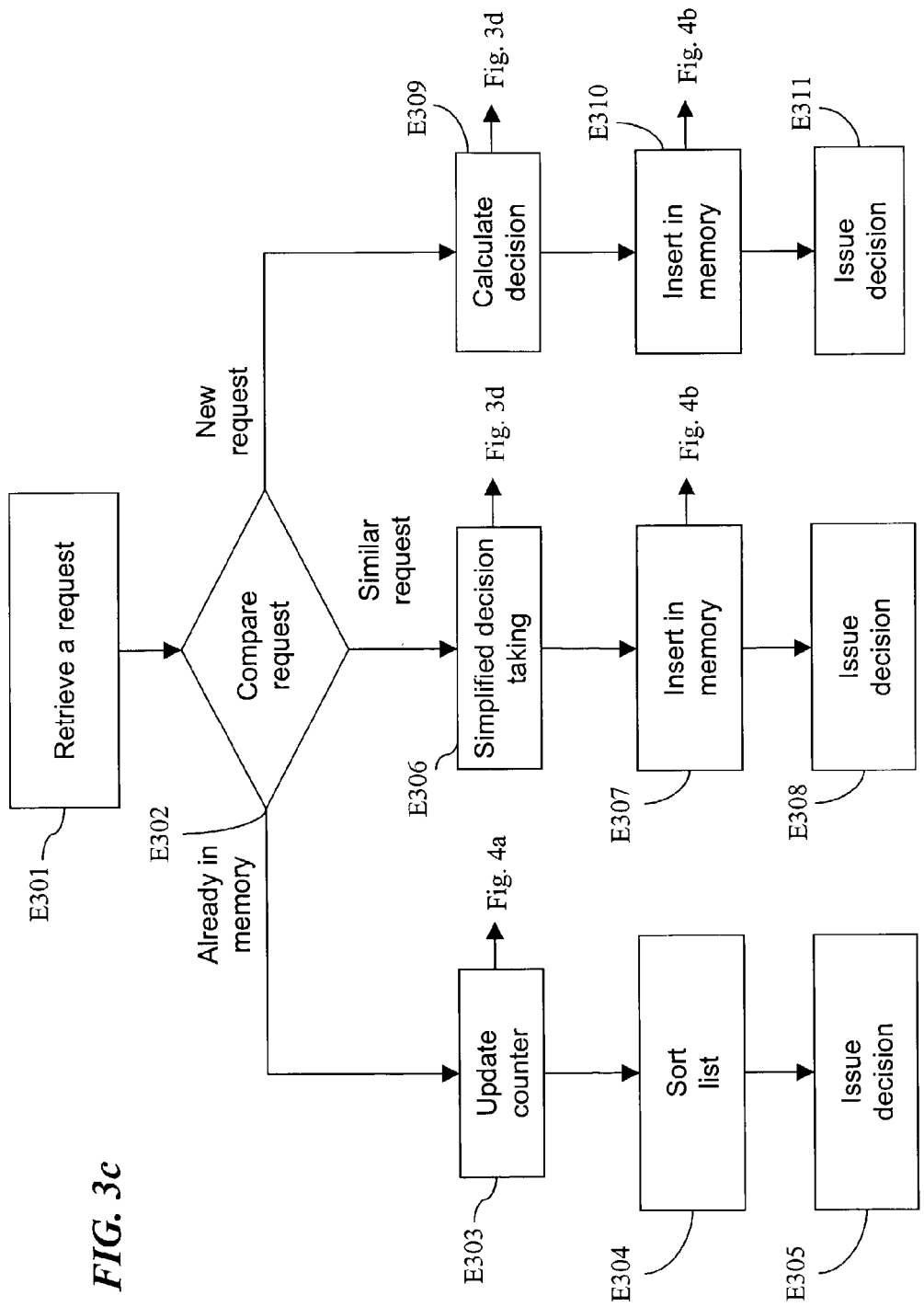
Figure 3D:
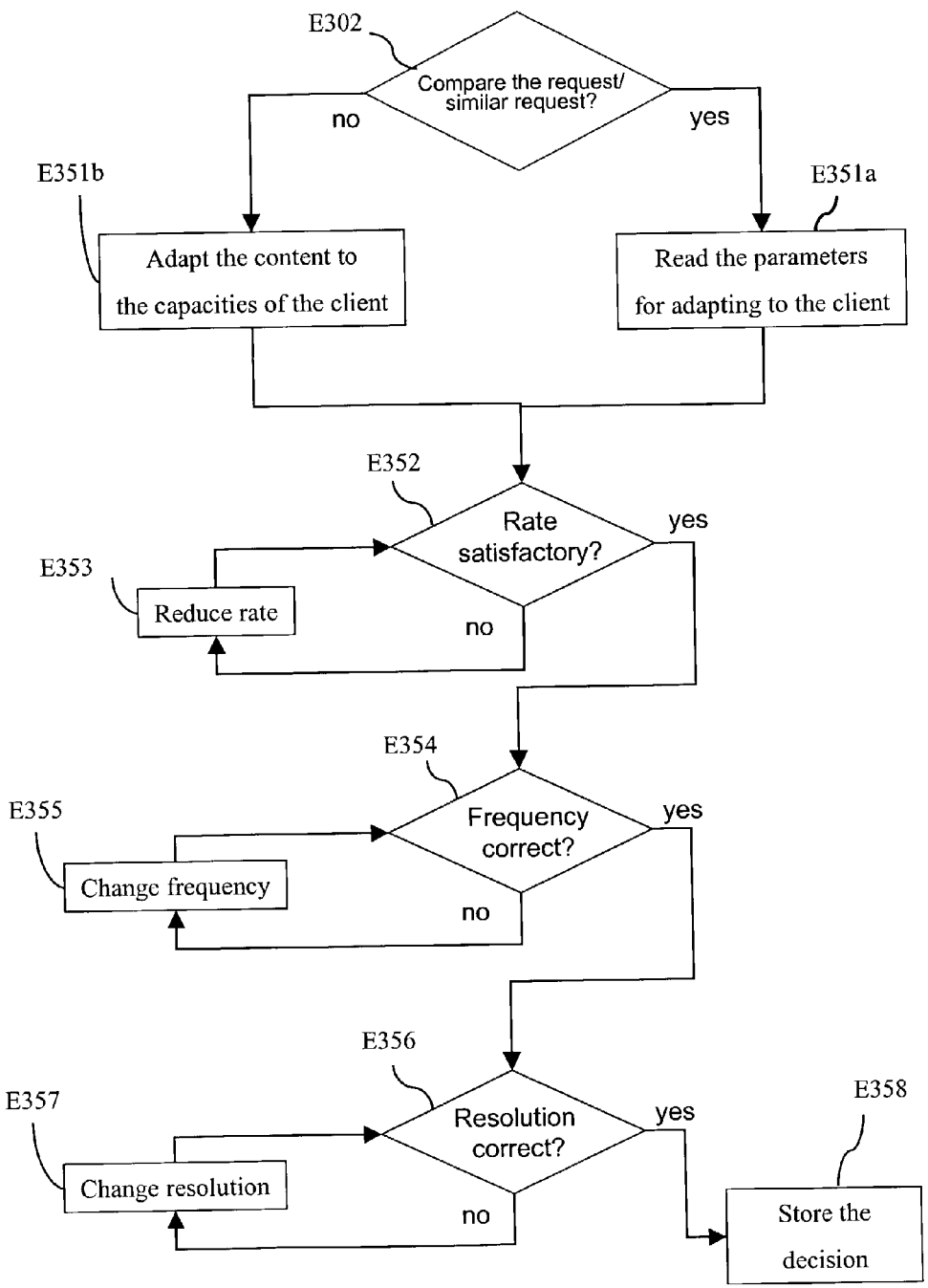
Figure 4A:
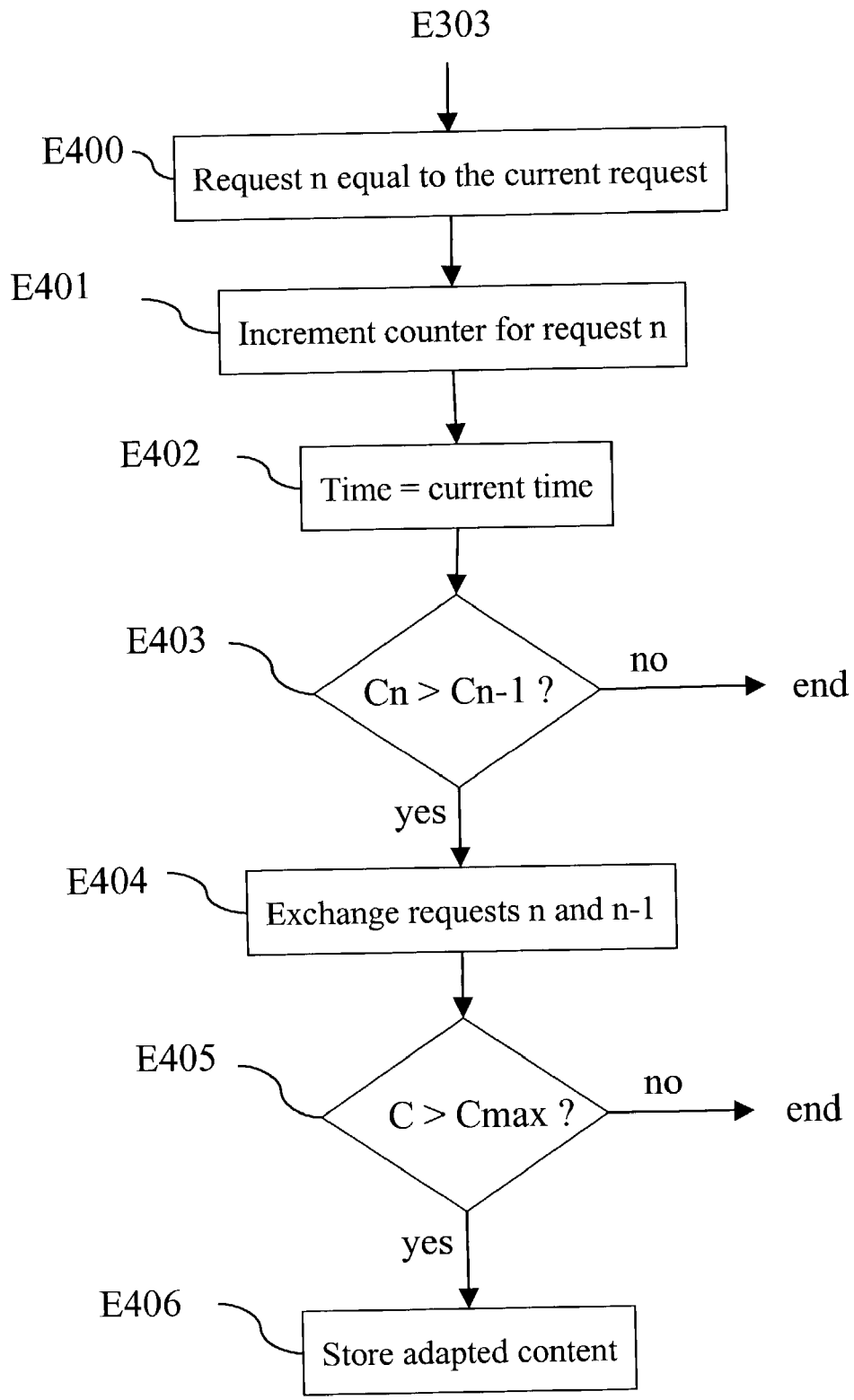
Figure 4B:
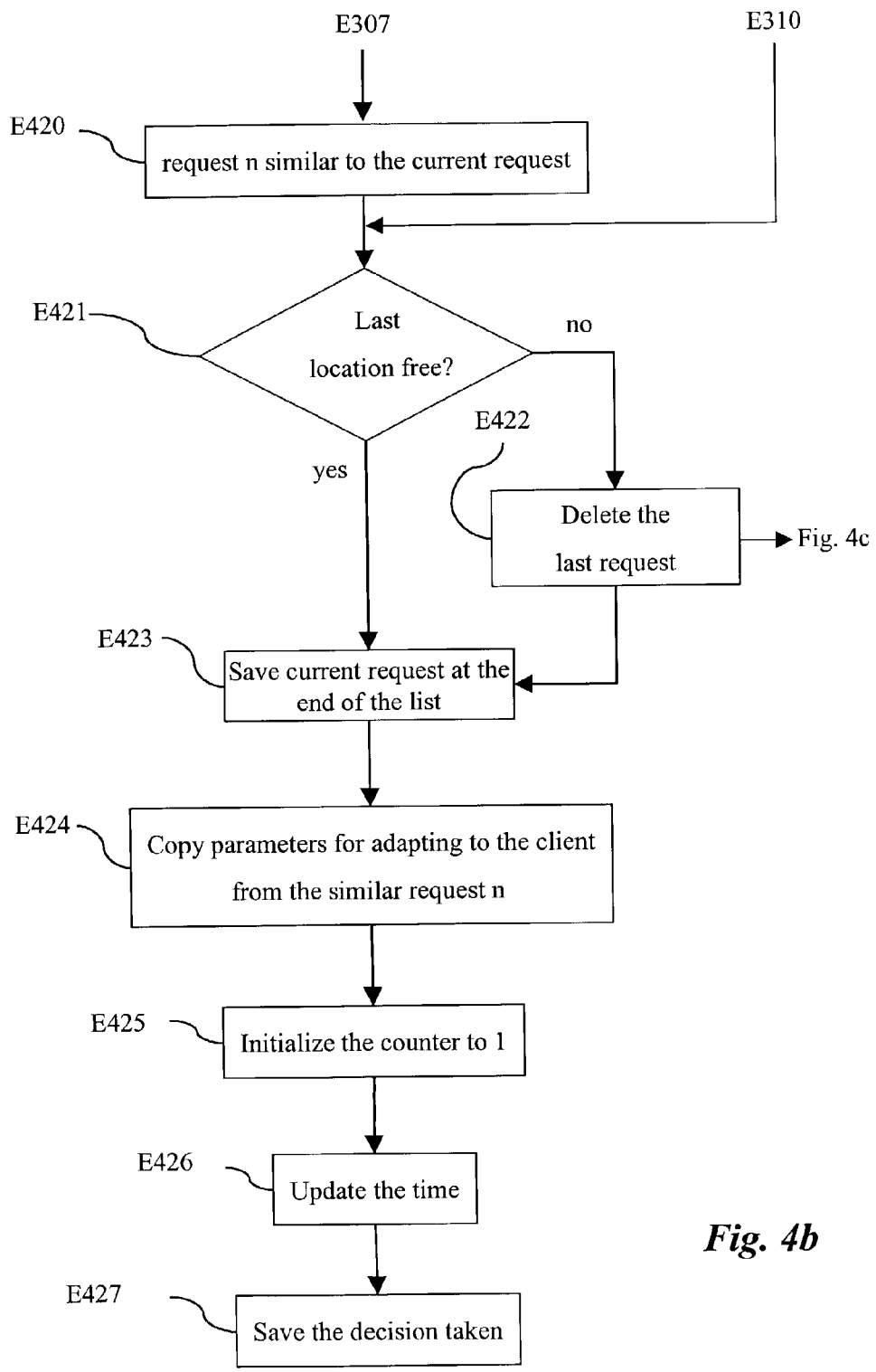
Figure 4C:
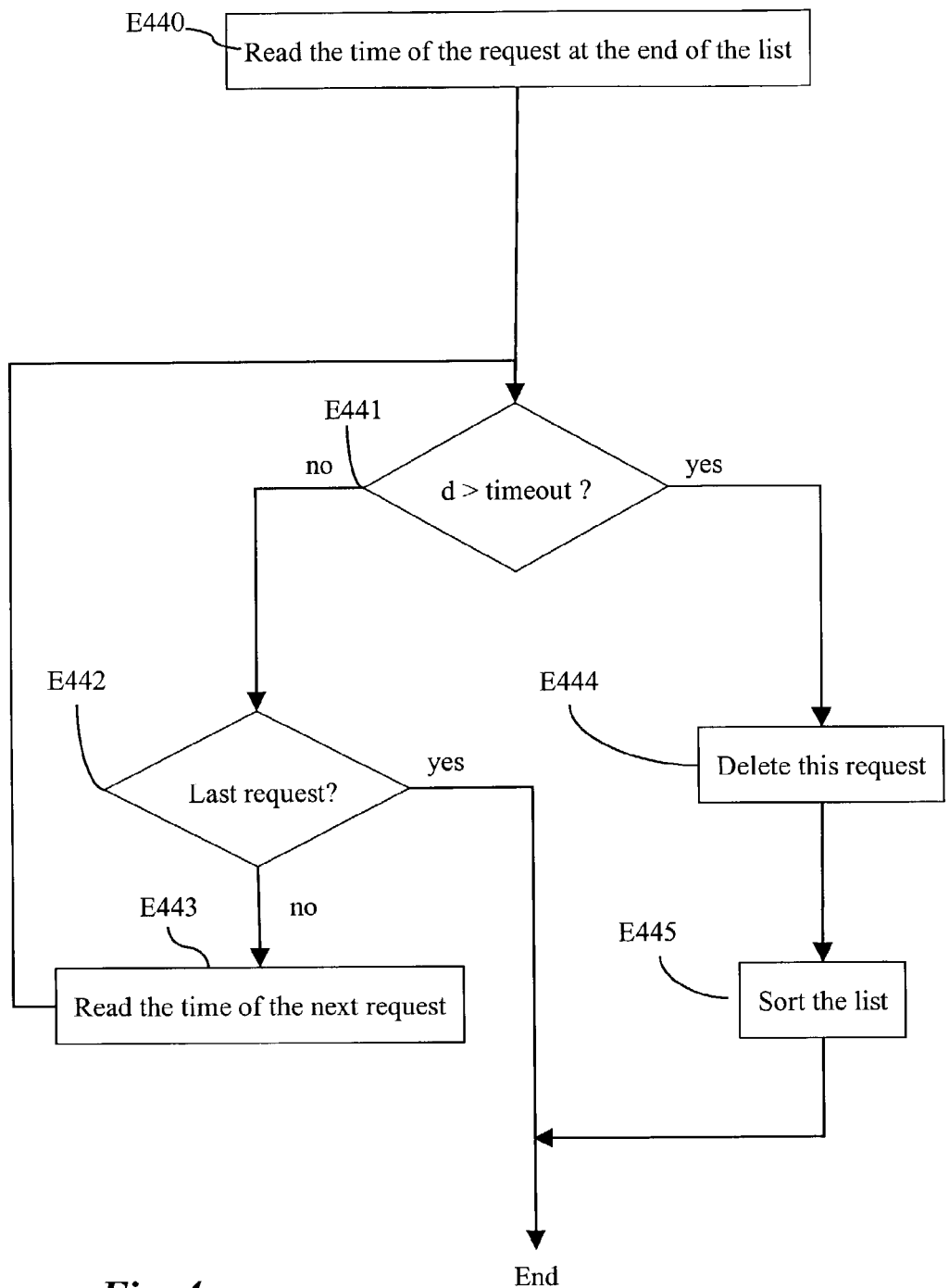
Figure 5:
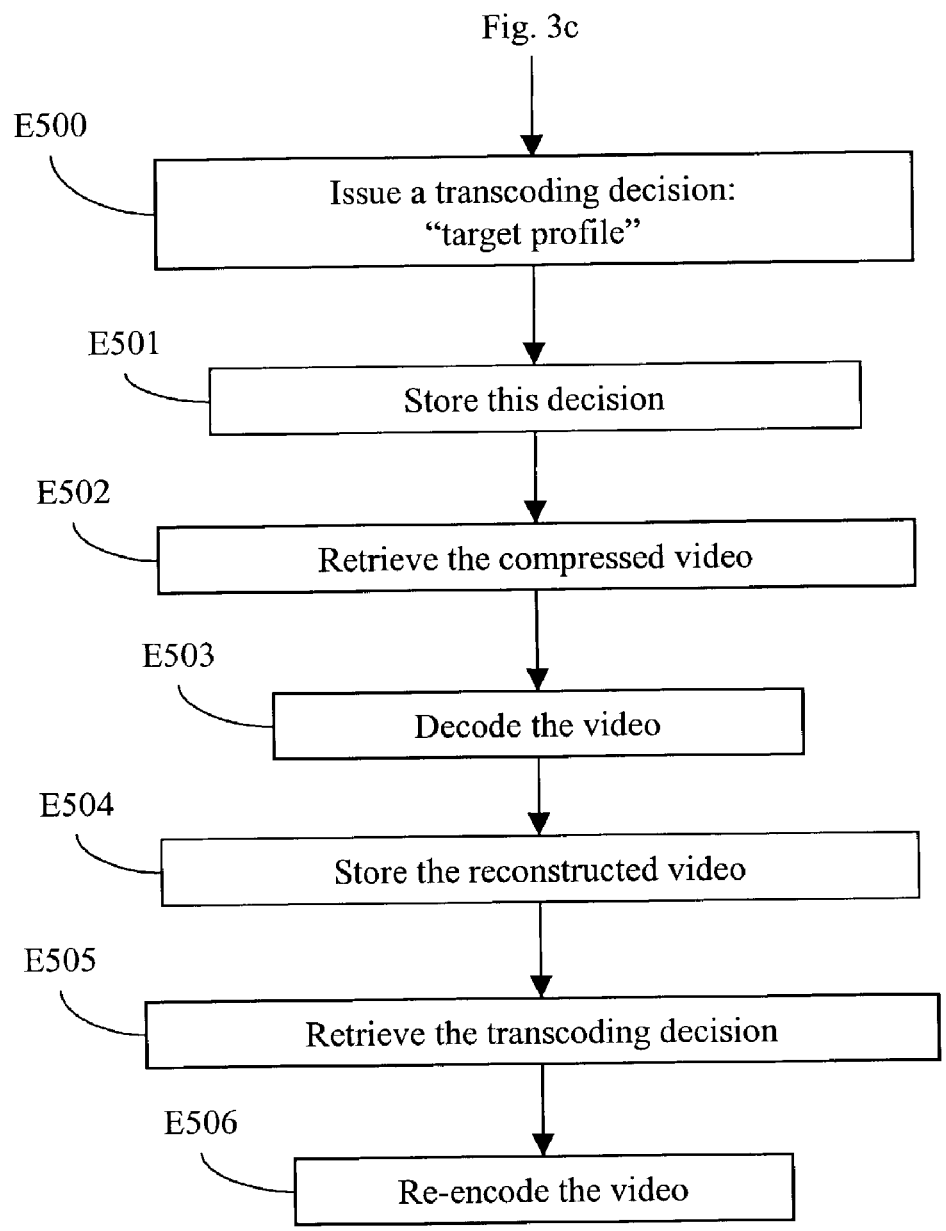
Figure 6:
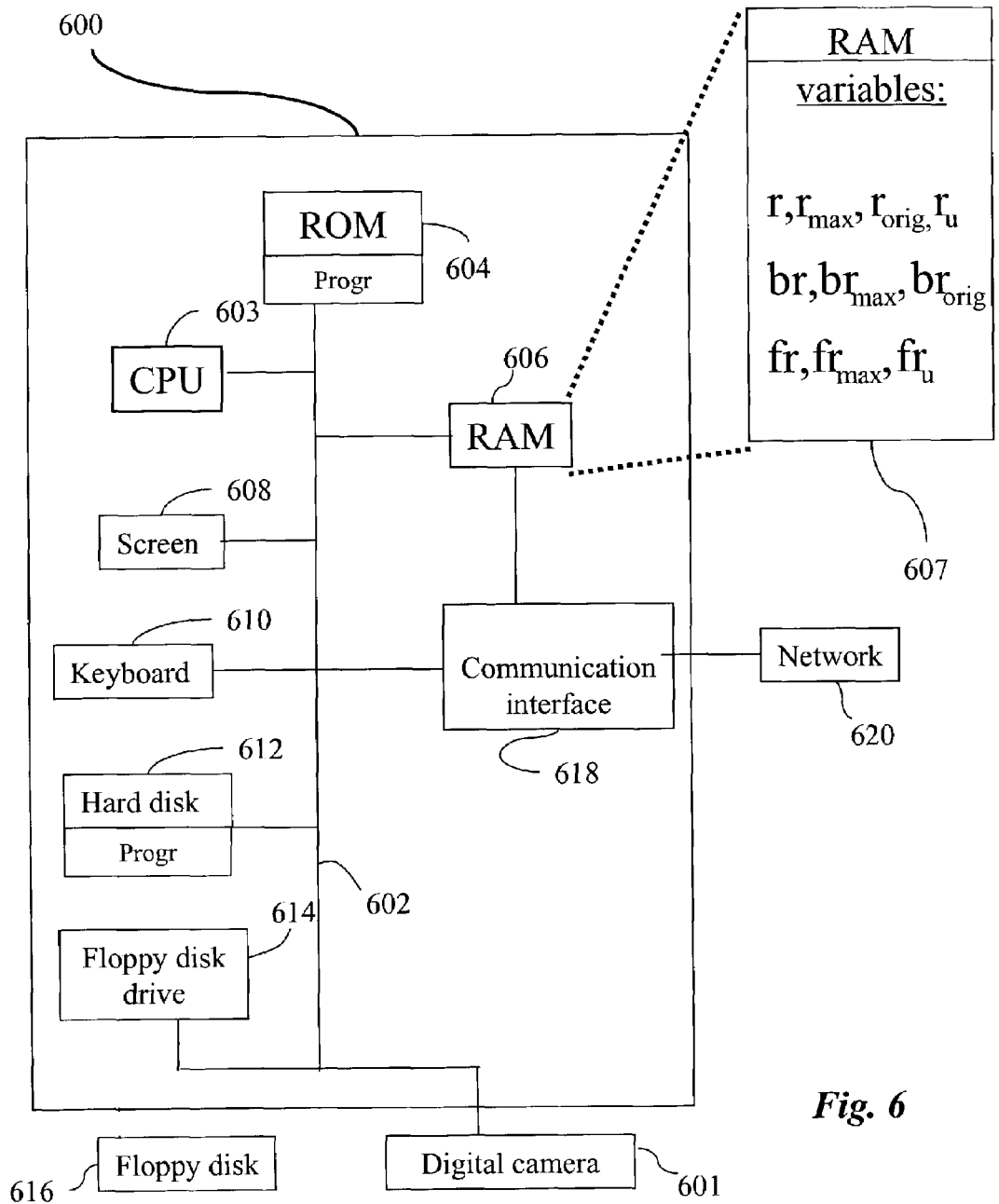

FIGS. 3a and 3b illustrate respectively the architecture and the storage unit 170 of the decision engine 17 of FIG. 1;

FIG. 3c illustrates an algorithm for processing a request;

FIG. 3d illustrates an algorithm detailing the decision taking process during processing of a request according to the algorithm of FIG. 3c;

FIG. 4a illustrates an algorithm detailing the operation of the memory 170 during processing of a request identical to an earlier request;

FIG. 4b illustrates an algorithm detailing the operation of the memory 170 during processing of a request similar to an earlier request;

FIG. 4c illustrates an algorithm detailing the operation of the memory 170 during processing of a request and, more particularly, the request deletion process;

FIG. 5 is a data transcoding algorithm;

FIG. 6 is one embodiment of a programmable appliance implementing the invention.

FIG. 1 depicts a client/server type communication architecture in which the invention is advantageously implemented;

In this figure, a first communication appliance 1 acting as the server is connected to a second communication appliance 2 which is the client machine, by means of a communication network 3 and a connection which is considered as being established.

This network is for example a local wireless communication network inside a home.

More particularly, this network conforms to the IEEE802.11 standard.

The example under consideration concerns a point-to-point transmission of data between the server 1 and the client machine 2.

However, the principle remains applicable where the server is connected simultaneously to a number of client machines which can request, from the server, multimedia digital data and, for example, the same content of a video.

There should however, in this case, be taken into account, on the one hand, management of the processes of adaptation and transmission in parallel of the different adapted versions of the requested data and, on the other hand, the multiple accesses to the server memory or memories.

It should be noted that the data stored in the server can have been received from the environment outside the home, for example by another communication network such as the Internet.

The data grouped together under the term multimedia data can be, non-limitatively, fixed images, videos, sound, text type data (e.g. graphical documents, etc.), HTML language documents, signals issuing from a facsimile machine or a printer, etc.

In the embodiment under consideration, there will be considered preferably video data which will be transmitted in compressed form, without loss, over the network 3.

The device according to the invention makes it possible to process a request transmitted by the client machine 2 and aimed at obtaining multimedia data and, more particularly, to take a decision on adapting the data to be transmitted according to the request.

The server 1 has the device 4 according to the invention which can have electronic elements and/or software elements.

The server 1 comprises a unit 5 for storing digital data such as videos.

However, the device 4 according to the invention could, for example, be merged with the server 1.

The available data contents are stored in compressed forms in the unit 5.

The compression formats used will be for example the MP3 format for audio data, the JPEG format for images and the MPEG format for videos.

It should be noted that the videos are created, for example, by a digital video camera or any other data acquisition means or transmitted by an external communication network and stored in the unit 5 which may or may not be included in the device 4.

This unit can, for example, be a local or distributed database.

The device 4 also comprises a storage unit 6 intended to temporarily store digital data and coded videos, these data being retrieved from the storage unit 5.

The data retrieved by the unit 6 are either the values associated with each pixel of each image of a video, or the information specific to this video, namely the size of the video file, the path allowing access to this video and, where the video is stored in compressed form, the coding parameters which were used to code this video.

The device 4 according to the invention also has a control unit 11 for the different operations executed in this device.

The device according to the invention comprises means of analyzing the requests submitted by different users and which come in the form of the units 13, 14, 15 and 16.

Each request formulated by a user from a client machine of the type of the machine 2 of FIG. 1 has a number of request descriptors that characterize it.

Among these descriptors there are:
characteristics of the client machine;
characteristics of the network;
information identifying the data to be supplied to the client machine;
the preferences specified by the user concerning the presentation or format of the data to be supplied.

The units 13 to 16 mentioned earlier analyze the request descriptors indicated above.

The device 4 comprises more particularly a unit 13 for retrieving the characteristics of the client machine 2, namely:
the calculating capacity of this machine and, more particularly, the frequency of the central processor which corresponds to the time taken for executing an instruction;
the memory capacity available in this machine and, more particularly, the size of the random access memory (RAM) usable for processing the requested contents, that is to say for decompressing them by means of the coding unit;
the size of the display unit expressed in pixels.

The device 4 also comprises a unit 14 for retrieving the characteristics of the network 3, namely principally the passband available in the network.

The device 4 comprises a unit 15 that retrieves the information on the content requested by the user. For example, for a video encoded in the MPEG-4 format described by the standard "*Information technology—Generic coding of audiovisual objects—part* 2: *Visual*", ISO/IEC JTC 1/SC 29/WG11 N3056, December 1999, this standard defines different levels and profiles which make it possible to determine typical values of the content description parameters such as:
the spatial resolution of the images composing the video;
the number of images per second;
the rate at which the video is encoded.

The device 4 also comprises a unit 16 that retrieves the preferences the user has been able to specify by means of a graphical interface. For characterizing these preferences, there will be considered, for example, the following parameters:
image display frequency in number of images per second;
spatial resolution of these images in number of lines and columns.

As depicted in FIG. 1, the device 4 according to the invention has a decision unit 17, referred to as a decision engine.

The function of the decision engine is to find the coding parameter or parameters which will be used to code the data intended for the client machine 2 originating the request and which correspond as closely as possible to the preferences of the user, to the characteristics of the client machine and to the state of the network.

The decision engine must find the most adapted coding parameter or parameters from the descriptors of the request under consideration which are the content requested by the user, their preferences, the characteristics of the network 3 and the characteristics of the client machine 2.

In the example described, there exist a number of coding parameters which form what is referred to as a "decision structure" and which are non-limitatively:
the spatial resolution of the images;
the display frequency of these images; and
the rate allocated to the representation of the compressed content (in kilobits per second).

The process of taking a decision on the adaptation of the content, which is performed by the decision engine 17, will be described later with reference to FIGS. 3*a* to 3*d*, and 4*a* to 4*c*.

The decision engine 17 controls a transcoding unit or module 18 which carries out the adaptation of the data requested by the user from the coding parameters of the decision structure mentioned above.

For example, the adaptation operations are carried out by means of a re-encoding in the MPEG-4 format described above.

The adaptation process performed by the transcoding module 18 will be described later with reference to FIG. 5.

The device 4 furthermore comprises a digital data transmit/receive unit 19.

The unit 19 makes it possible to perform the transmission of data to the client machine 2, through the network 3, in response to the requests transmitted from this machine, as well as the reception of data coming from the client machine.

It should be noted that the different units composing the device according to the invention and, more generally, the server, reside on the same machine.

However, it can be envisaged to distribute these units over a number of server machines and to establish communications between these different units through the communication network 3.

Since this distribution of units in no way modifies the implementation of the invention, it will be considered subsequently, for reasons of simplicity, that all the units are located on the same machine which is referred to as the server.

The client machine 2 has a digital data transmit/receive unit 20.

This unit 20 makes it possible to perform the transmission of data to the device 4 and notably of requests aimed at obtaining data through the network 3, as well as the reception of data coming from the device in response to such requests.

The client machine 2 also has a digital data storage unit 21, a graphical interface 22, a decoding unit 23 identical to the coding unit, not depicted, of the device 4 and a display unit 24, making it possible to display the decoded data.

The graphical interface 22 allows the user of the client machine 2 to interact with this machine and control the different units.

Figure 2:
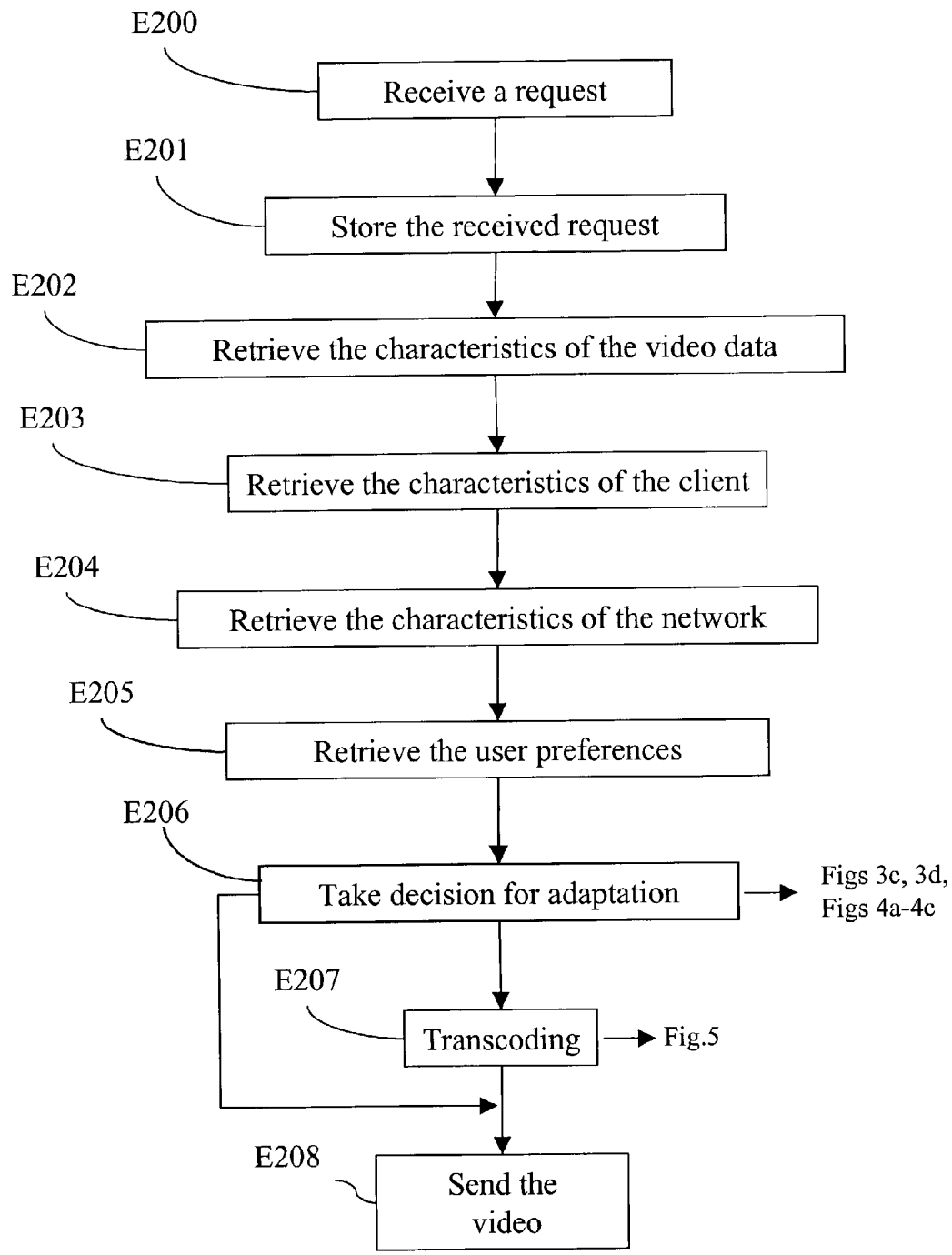
FIG. 2 depicts a video data processing algorithm according to the invention.

FIG. 2 illustrates an algorithm having different instructions or portions of software code corresponding to steps of the method according to the invention. This algorithm details the overall operation of the device 4 of FIG. 1.

The computer program denoted "Progr" which is based on this algorithm is stored in the temporary data storage unit 6 of FIG. 1 and executed by the different units 13 to 19 under the control of the control unit 11, which thus makes it possible to implement the method according to the invention.

This program is also stored in the appliance of FIG. 7.

The algorithm of FIG. 2 has a first step denoted E200 during which the device 4 of FIG. 1 and, more particularly, the receive unit 19 receives a request sent by the transmit unit 20 of the client machine 2.

For example, this request comes in the form of a character string making it possible to uniquely identify video data stored in the storage unit 5 of the server 1, as well as the characteristics of the client machine from which the request comes and the preferences formulated by the user of the client machine, for example, as regards the display of these video data.

The different descriptors of the request are illustrated in FIG. 3b.

However, there are cases where the characteristics of the network are not present in the request but can be retrieved by the unit 14 of FIG. 1.

During the following step E201, the request coming from the client machine 2 is transferred to the temporary storage unit 6 for the purposes of storage.

The step E201 is followed by a step E202 during which the unit 15 retrieves the characteristics of the video data stored in the storage unit 5 of FIG. 1 (initial coding parameters, text specification, etc.), from the content information descriptor supplied by the request.

The content descriptor is represented by the module 501 in FIG. 3b and the information describing the requested content is, for example, the spatial resolution of the video, the number of images per second of this video (time resolution) and the rate of the image sequence.

The video data retrieved from the storage unit 5 are then stored in the temporary storage unit 6.

During the following step E203, the unit 13 obtains characteristics of the client machine 2 which sent the request mentioned at the step E200, from the corresponding descriptor present in this request.

These characteristics are principally the calculating capacity of the client machine 2, the memory capacity it has available and the size of its display unit 24 (screen).

These characteristics are stored temporarily in the storage unit 6 of the device 4 of FIG. 1.

The step E203 is followed by a step E204 during which the unit 14 obtains the characteristics of the communication network 3 (the passband available for transmitting the video data from the device 4 to the client machine 2) from the corresponding descriptor present in the request.

When these characteristics are not present in the request, the unit 14 can send a test message to the client machine 2 which the latter returns to it.

The unit 14 can thus estimate the transmission time and therefore the passband of the network 3.

These characteristics are stored in the temporary storage unit 6.

During the following step E205, the unit 16 obtains the preferences of the user that the latter has specified in the request and stores them in the temporary storage unit 6.

It should be noted that each of the aforementioned units 13 to 16 carries out an analysis of the descriptors of the request being processed in order to extract therefrom the relevant information that will be useful in the remainder of the processing according to the invention.

During the following step E206, the decision engine 17 will take a decision as regards adapting the content requested by the user to the characteristics of the client machine 2 and of the network, as well as to the preferences of the user.

During this step, there will be determined the coding parameter or parameters adapted to the request and which will be used for coding the data to be transmitted to the client machine 2.

Detail of the operations performed during this step will be provided later during the description given with reference to FIGS. 3a to 3d and 4a to 4c.

This step is performed by the unit 17 of the device 4 of FIG. 1, under control of the control unit 11, and from the information available in the temporary storage unit 6.

During the following step E207, the module 18 of FIG. 1 performs the transcoding of the data to be transmitted to the client machine 2 as will be described later with reference to FIG. 5.

During this step, the transcoding module 18 adapts the data to be transmitted with the coding parameter or parameters determined at the step E206.

However, in certain cases that will also be mentioned below, the decision engine 17 decides that the data to be transmitted to the client machine are already available in transcoded form in the storage unit 5 of FIG. 1.

The step E206 is then directly followed by the step E208.

During the step E208, the device 4 of FIG. 1 and, more particularly, the transmit unit 19 of said device, transmits the video data which were previously transcoded or not at the step E207 to the client machine 2.

It should be noted that transmission of the compressed video data takes place preferentially by streaming, that is to say the information necessary to the user for reconstructing an image is stored in the storage unit 6, and then transmitted to the client machine 2 before all the video data are compressed.

Thus, the user receives, at the client machine 2, the information in packets, in each of which there is information allowing that user to decode a current image.

FIG. 3a shows the different modules constituting the decision engine 17.

The decision engine 17 comprises a memory module 170 where it is decided to store the requests submitted to the device 4 of FIG. 1 and the transcoding decision associated therewith once the requests have been processed, as well as the parameters for adapting a particular content to a particular client (module 507 of FIG. 3b).

The content of the memory 170 and its management are described below with reference to FIG. 3b.

FIG. 3b depicts the different data stored in the memory 170 of the decision engine 17.

Thus, this memory has a module 500 which defines the context of a request and which consists of the descriptors of the requested content 501, the client machine 502 that sent the request, the preferences of the user 503 originating the request and the network 504.

With this context there are associated the following additional data:

- a counter 505 which makes it possible to know, for each context, the number of times it has appeared and to classify the list of requests according to their frequency of appearance;
- the time of the last appearance of a request 506 (time of entry into memory) which makes it possible, during the moments of inactivity of the device 4, to delete the oldest requests from the memory;
- descriptors of the parameters for adapting the content to the client 507 which allow speeded up decision taking when a request similar to a request present in memory is submitted to the device 4;

transcoding decision descriptors 508 which correspond, for example, to the control parameters of a video encoder to the MPEG-4 format, these parameters being essentially a rate, a spatial resolution and a time resolution for the images.

The memory 170 of the decision engine 17 is bounded and limited to N contexts and N decisions, so that the memory consumption by the method according to the invention is controllable and predictable.

Returning to FIG. 3a, the decision engine comprises modules 171 (memory read/write module), 172 (memory manager) and 173 (request counter) which make it possible respectively to retrieve, insert requests and classify them according to their frequency of appearance.

The decision engine 17 also comprises a module 174 which makes it possible to compare a request being processed with the requests present in memory and which have therefore been processed earlier by the method according to the invention.

Three results are expected at the output of this module:
the request being processed has been identified among the earlier requests;
a similar request has been identified among the earlier requests;
the request being processed corresponds to a new request.

The first result corresponds to the case where the context of the request being processed is the same as that of a request already present in memory (same request descriptors). This case is encountered, for example, when the same user requests the same content, from the same client machine, and the state of the network is identical to what it was when the earlier request was processed.

It is considered that the state of the network is identical when the passband available at the instant t+1 differs from that available at the instant t by a number of kilobits per second.

The second result corresponds to the case where the context of the request being processed has similarities with one of the requests present in memory (at least one request descriptor in common).

This case is encountered, for example, when the state of the network or the preferences of the user have changed between two requests and the characteristics of the content (module 501 of FIG. 3b) and of the client (module 502 of FIG. 3b) are identical.

In this case, the decision taking which is performed by an optimization module 175 (FIG. 3a) is simplified since the parameters for adapting to the client 507 have already been calculated earlier and are already available.

This simplified decision taking is illustrated in FIG. 3d which will be described later.

The third result forces the decision engine 17 to take a decision by considering all the descriptors of the context (module 500 of FIG. 3b) of the request. As for the previous case, this decision taking is also illustrated in FIG. 3d.

The decision engine 17 further comprises a unit 176 that allows the decision engine 17 to communicate with the other units of the device 4 and, notably, its temporary storage unit 6.

FIGS. 3c, 3d and 4a to 4c illustrate the operating algorithms of the decision engine of FIGS. 3a and 3b.

The algorithm in each of the FIGS. 3c, 3d, and 4a to 4c concerns particular operations in the processing of a request according to the invention and which are performed during execution of the step E206 of FIG. 2.

More particularly, each algorithm has different instructions or portions of software code corresponding to steps of the method for processing a request according to the invention.

The computer program that is based on this algorithm is stored in the temporary data storage unit 6 of FIG. 1 and executed by the decision engine 17 under the control of the control unit 11.

This program forms part of the program "Progr" mentioned before with reference to FIG. 2 and is also stored in the appliance of FIG. 6.

Execution of the computer program based on this algorithm will implement the method enabling a decision to be taken on adapting the content to be transmitted to the client machine following upon its request.

The algorithm of FIG. 3c illustrates the method of processing a current request and starts with a first step E301 during which the read/write unit 176 of the decision engine 17 (FIG. 3a) retrieves the request stored previously in the temporary storage unit 6 of FIG. 1.

During the following step E302, the decision engine 17 searches in its memory 170 (FIGS. 3a and 3b) as to whether the request being processed is already totally or partially present therein.

More precisely, the module 174 performs a comparison of the current request with the earlier requests already processed and stored in memory in the module 170.

This operation consists of examining, for the current request and for each earlier request, the different request descriptors (parameters describing the context of the request and stored in the module 500 of FIG. 3b), comparing them one by one.

According to the result of this comparison, it can be decided whether the current request is identical to an earlier request (steps E303 to E305), similar to an earlier request (steps E306 to E308) or new compared with the earlier requests (steps E309 to E311).

Where the current request is identified as being identical to a request already processed, the step E302 is followed by the step E303 which consists of incrementing by one unit the number of occurrences of this request. This operation is illustrated in FIG. 4a which is described below.

During the following step E304, the list of requests present in the memory is resorted in order of decreasing frequency of appearance. This sort is carried out by the memory manager 172 of FIG. 3a.

It should be noted that, in the case of an identical request, the method according to the invention makes provision to take into account the coding parameter or parameters which were determined earlier according to the descriptors of the current request or only certain of them considered as having priority.

It is therefore not necessary to calculate these coding parameters again, which speeds up the processing of the request.

During the following step E305, the transcoding decision is saved in the unit 6 of the device 4 from where the transcoder 18 will retrieve it in order to perform the transcoding during the step E207 (FIG. 2).

FIG. 4a illustrating the operation of the memory 170 details the steps E303 and E304 of FIG. 3c and starts with a step E400 during which the instant when the current request is identified as a request present in memory (request n) is determined by the request comparator 174 (FIG. 3a).

The following step E401 consists of incrementing by one unit the counter 505 (FIG. 3b) associated with this request n and which counts the number of appearances of each request.

At the following step E402, the time of entry into memory 506 associated with the request n is made equal to the current time.

During the step E403, a test is made as to whether the value written in the counter 505 of the request n, $C_n$, has become greater than that of the request n−1, $C_{n-1}$.

If the answer is no, the insertion of the request is then finished.

If the answer is yes, the requests n and n−1 are exchanged during the step E404, so as to maintain an organization of the requests in order of decreasing frequency.

During the following step E405, a check is made as to whether the request n, which became n−1 at the previous step E404, forms part of the few most frequent requests by comparing the content of the counter C (frequency of appearance) with a predetermined threshold $C_{max}$.

If such is the case, then, during the step E406, it is decided that the content transcoded according to the decision having just been taken will be stored in the storage unit 5 of the server 1, unless the step E405 has made it possible to detect that this content had already been transcoded and stored just as it stands during an earlier processing of the request under consideration.

In this case, the transcoding step E207 of FIG. 2 is not executed.

If, on the contrary, this request is not situated high up in the list (the most frequent requests), then the processing of the request is finished which ends the algorithm of FIG. 4a.

Returning to FIG. 3c, in the case where the current request has not already been processed, but a request present in memory has been detected as being similar, the step E302 is followed by the step E306.

During this step, a decision is taken in a simplified manner and will be detailed later during the description given with reference to FIG. 3d.

It is decided that the request being processed is similar to a request processed earlier and stored inasmuch as the two requests have at least one request descriptor in common.

However, in order to further speed up the processing of a request according to the invention, it will be decided, for example, that a request is similar to an earlier request if these two requests have at least two request descriptors in common chosen among those illustrated in FIG. 3b.

FIG. 3d will illustrate an example of request similarity.

The request is then inserted in the memory 170 of the decision engine 17, during the step E307, according to the algorithm illustrated in FIG. 4b which will be described later.

If no request was found during the test of the step E302, then the next step will be the step E309 where a complete calculation of the transcoding decision is performed according to the algorithm illustrated in FIG. 3d described below.

The request is then inserted in the memory 170 of the decision engine 17, during the step E310, according to the algorithm of FIG. 4b.

FIG. 3d illustrates the decision taking process for adapting the contents within the context of the method of processing a current request. This decision taking is guided by the result of the test of the step E302 of FIG. 3c.

In the case of a current request identified as being similar to a request present in memory 170, it is sufficient to read the adaptation parameters 507 (FIG. 3b) during the step E351a.

During this step, therefore, account is taken just of the coding parameters which will be used for coding the data to be transmitted and which have already been determined earlier and stored in the module 170, according to two request descriptors in common.

In the example under consideration, the descriptors that are common between the request being processed and the earlier request are the descriptor 501 of the content requested by the user and the descriptor 502 of the client machine 2.

If, on the contrary, the request submitted to the device 4 of FIG. 1 is not considered as being similar to any request present in the memory 170, then the parameters for adapting 507 the content to the client must be calculated at the step E351b.

According to one very simple embodiment of the invention, this adaptation consists of finding the spatial resolution r of the images such that $r=min(r_{max},r_{orig})$, where $r_{max}$ corresponds to the size of the screen of the client machine, expressed in number of pixels per line and per column and $r_{orig}$ corresponds to the size of the encoded images in the video sequence requested by the user.

There is thus determined a coding parameter for the data to be transmitted to the client machine according to a descriptor which characterizes the request being processed.

The following steps E352 and E353 make it possible to adapt the content to the request descriptor 504 (FIG. 3b), namely the passband of the transmission network, by determining a rate br for re-encoding of the requested video.

The step E352 consists more particularly of comparing the passband, $br_{max}$, of the transmission network with the rate representing the sequence of compressed images, $br_{orig}$.

During the step E353 there is selected, from among a set of predefined rate values (multiples of 16 kilobits per second, for example), a value br such that $br=min(br_{max},br_{orig})$.

The following steps E354 to E357 take into account another request descriptor, namely the preferences of the user 503 (FIG. 3b).

First of all, the steps E354 and E355 make provision for adapting the frequency of the images, fr, to the wishes of the user, $fr_u$.

The step E354 thus consists of checking whether the following inequality, $fr_u < fr_{max}$, is correctly complied with, where $fr_{max}$ corresponds to the original frequency of the images in the sequence of compressed images.

If the answer is no, at the step E355 there is selected, from among a set of predefined frequency values (5, 10, 15, 20, 25, 30 images per second, for example), a value fr such that $fr=min(fr_u,fr_{max})$.

If the answer is yes, the following steps E356 and E357 are concerned, during which the spatial resolution of the images to be transmitted is determined according to the preferences of the user.

The step E356 thus consists of checking whether the following inequality, $r_u < r_{max}$, is correctly complied with, where $r_{max}$ corresponds to the spatial resolution calculated at the step E351b or read at the step E351a and where $r_u$ corresponds to the resolution desired by the user.

If the answer is no, during the step E357 there is selected, from among a set of predefined resolution values (sub-QCIF, QCIF, CIF, for example), a value r such that $r=min(r_u,r_{max})$.

It should be noted that the CIF or Common Intermediate Format defines image sizes of 352 columns by 288 lines. The QCIF and sub-QCIF formats are derived from this format.

QCIF (Quarter-Common Intermediate Format) defines a spatial resolution of 176 columns by 144 lines.

As for sub-QCIF (Sub-Quarter-Common Intermediate Format), this defines a spatial resolution of 128 columns by 96 lines.

If the aforementioned inequality is complied with, the step E358 is performed next.

During this step, with all the parameters or descriptors of the decision 508 having been calculated previously, these are stored, on the one hand, in the unit 6 of the device 4 and, on the other hand, in the module 170 at the end of the list of requests already present.

The context of the request 500 and the intermediate parameters for adapting to the client 507 are also stored in this module 170.

Storing of the decision is carried out during the step E311 (FIG. 3c) for the complete calculation (new request), and during the step E308 for the simplified decision taking (similar request).

FIG. 4b illustrates the operation of the memory 170 of the decision engine 17 and, notably, the insertion in memory (step E307 of FIG. 3c) of a request considered to be similar to a request n present in memory.

In FIG. 4b, the first step E420 corresponds to the instant when the current request is identified as a request similar to a request n present in memory.

During the following step E421, it is examined whether the last location in the memory 170 is unoccupied (counter 505 equal to 0).

If the answer is yes, the step E423 is moved to directly.

If the answer is no, the following step E422 resets to zero the fields of the request situated at the end of the list in order to delete said request from this list. Deletion of the oldest requests will be described later with reference to FIG. 4c.

The location thus freed makes it possible to insert the current request at the end of the list during the following step E423.

During the step E424, there is copied, from the similar request n, the parameters for adapting to the client stored in the unit 507 of the decision engine 17.

At the step E425, the counter 505 is initialized and the time 506 of the request is updated at the step E426.

The last step E427 aims to save the transcoding decision 508 (FIG. 3b) obtained at the step E308 of FIG. 3c by the optimization module 175 of the decision engine 17.

The method of inserting an entirely new request (step E310 of FIG. 3c) follows the same algorithm, with the exception of the step E424 which is replaced by a step of retrieving the parameters for adapting to the client issuing from the calculation performed by the module 175 of the decision engine 17, during the step E309.

FIG. 4c illustrates the management of the memory 170 of the decision engine 17 and, notably, the removal of the oldest requests.

Thus, starting with the least probable request situated at the end of the list, the first step E440 consists of reading its time of entry into memory in the memory area 506 (FIG. 3b).

During the following step E441, it is examined whether the difference between the current time and the time read previously is greater than a predefined time period (for example a few days or a few weeks).

If the answer is no, the next step performed is the step E442 which tests whether the processed request is the last request in the list. If it is the last, the processing is finished.

Otherwise, during the step E443, the time of entry into memory of the next request in the list (with a higher counter 505) is read and the test used at the step E441 is executed again. This process is reiterated as long as the last request has not been reached or the test on the time period is confirmed.

If the request being processed turns out to be too old, then, during the step E444, all the fields 501 to 508 (FIG. 3b) associated with this request are set to zero.

The following step E445 next performs a new sort of the list, starting with the most frequent request and going to the least frequent request.

The algorithm of FIG. 5 has different instructions or portions of software code corresponding to steps of the transcoding method according to the invention.

The computer program based on this algorithm is stored in the temporary data storage unit 6 of FIG. 1 and executed by the unit 18 under the control of the control unit 11.

This program forms part of the program "Progr" mentioned before with reference to FIG. 2 and is also stored in the appliance of FIG. 6.

Execution of the computer program based on this algorithm will implement the method allowing use of the transcoding decision obtained previously with a view to performing an adapted transcoding of the data to be transmitted to the client machine.

FIG. 5 illustrates the operations of transcoding or adaptation of the content which are performed by the transcoding module 18 of FIG. 1, following issuing of the transcoding decision taken by the decision engine 17 during one of the steps E304, E307 or E310 of FIG. 3.

The step E500 of FIG. 5 repeats this step and is followed by a step E501 during which the decision is stored temporarily in the temporary storage unit 6 of the device 4 of FIG. 1.

At the following step E502, the transcoding module 18 retrieves the identifier of the content previously stored in the temporary unit 6 during execution of the step E201 of FIG. 2. This identifier then allows it to access the content located in the storage unit 5.

As seen previously, this content is stored in a compressed form.

During the following step E503, this content is decompressed and it is stored during the transcoding in the temporary unit 6 (step E504).

Next, the transcoding module 18 retrieves, from the unit 6 (step E505), the transcoding decision issued by the module 12 during the step E500 and stored during the step E501. This decision contains the new coding parameters and/or those already calculated earlier and stored.

These parameters are used for the re-encoding of the content taking place at the step E506.

This transcoded content is next transmitted to the client machine 2 by means of the transmit/receive unit 19 of the device 4, as indicated previously with reference to the step E208 of FIG. 2.

With reference to FIG. 6, a description is given of an example programmable appliance implementing the invention. This appliance is adapted to process multimedia digital data with a view to transmitting them.

According to the embodiment chosen and depicted in FIG. 6, an appliance implementing the invention is for example a microcomputer 600 or a workstation connected to various peripherals, for example a digital camera 601 (or a scanner, or any image acquisition or storage means) connected to a graphics card and supplying the appliance with data to be adapted and transmitted.

The appliance 600 has a communication bus 602 to which the following are connected:

a central processing unit 603 (microprocessor), which fulfils the function of the control unit 11 of FIG. 1;

a read only memory 604, capable of including the program "Progr";

a random access memory 606, having registers 607 adapted to record variables created and modified during execution of the aforementioned program and notably the variables $r_{max}$, $r_{orig}$, $r_u$, br, $br_{max}$, $br_{orig}$, fr, $fr_{max}$, $fr_u$ mentioned with reference to the previous figures;

a screen 608 making it possible to display the data to be processed and/or to serve as a graphical interface with the user who can interact with the program according to the invention, by means of a keyboard 610 or any other means such as a pointing device, not depicted, like for example a mouse or a light-pen;

a hard disk 612 capable of including the aforementioned program "Progr";

a floppy disk drive 614 adapted to receive a floppy disk 616 and to read therefrom or write thereon data processed or to be processed according to the invention;

a communication interface 618 connected to a communication network 620, for example the Internet, the interface being able to transmit and receive data.

In the case of audio data, the appliance also comprises an input/output card connected to a microphone, neither of which is depicted.

The communication bus allows communication and interoperability between the different elements included in the microcomputer 600 or connected thereto. The representation of the bus is not limitative and, notably, the central unit is liable to communicate instructions to any element of the microcomputer 600 directly or by means of another element of this microcomputer 600.

The executable code of the program denoted "Progr" enabling the programmable appliance to implement the methods of processing and decision as regards adaptation of the content (FIGS. 2, 3b, 3c, 4a-c) and the method of adapting the content (FIG. 5) according to the invention can be stored for example on the hard disk 612 or in read only memory 604 as depicted in FIG. 6.

Although only one program is identified, it is possible to have a number of programs or sub-programs for implementing the invention.

According to a variant, the floppy disk 616 can contain compressed and stored data as well as the executable code of the program or programs according to the invention which, once read by the appliance 600, will be stored on the hard disk 612.

In a second variant, the executable code of the program or programs can be received by means of the communication network 620, via the interface 618, in order to be stored in an identical manner to that described previously.

The floppy disks can be replaced by any information medium such as, for example, a compact disk (CD-ROM) or a memory card. In general terms, an information storage means, readable by a computer or a microprocessor, integrated or not with the appliance, and possibly removable, is adapted to store a program, the execution of which allows the implementation of the method according to the invention.

In more general terms, the program can be loaded into one of the storage means of the appliance 600 before being executed.

The central unit 603 will command and direct the execution of the instructions or portions of software code of the program or programs according to the invention, said instructions being stored on the hard disk 612 or in the read only memory 604 or in the aforementioned other storage elements. Upon power-up, the program or programs which are stored in a non-volatile memory, for example the hard disk 612 or the ROM 604, are transferred into the RAM 606 which will then contain the executable code of the program or programs according to the invention, as well as registers for storing the variables necessary for implementing the invention.

It should be noted that the communication appliance having a device according to the invention can also be a programmed appliance.

This appliance then contains the code of the computer program or programs for example fixed in an Application Specific Integrated Circuit (ASIC).

It should be noted that the appliance of FIG. 6 that contains the previously mentioned program "Progr" can be, within the context of a client/server type communication architecture, the device 4 of FIG. 1.

The invention claimed is:

1. A method for transmitting transcoded multimedia data from a first communication appliance to a second communication appliance via a communication network which connects the first and second communication appliances, wherein the method is performed in the first communication appliance and comprises:

receiving from the second communication appliance a request for the multimedia data, wherein the request includes a number of descriptors characterizing the request;

retrieving the multimedia data from a digital data storage unit which stores the multimedia data;

determining a coding parameter for transcoding of the multimedia data, wherein the coding parameter is determined in accordance with the request;

transcoding the retrieved multimedia data in accordance with the coding parameter; and transmitting the transcoded multimedia data to the second communication appliance;

wherein the step of determining a coding parameter comprises:

analyzing the descriptors characterizing the request being processed;

comparing the result of the analysis with the descriptors of other requests processed earlier;

according to the result of the comparison, designating whether the request being processed is an identical request, or a similar request or a new request, wherein an identical request is identical to a request processed earlier, in the sense that the two requests have the same request descriptors;

a similar request is similar to a request processed earlier, in the sense that the two requests have at least one request descriptor in common;

a new request is new compared with the requests processed earlier, wherein, when the request being processed is designated as a similar request, the coding parameter is determined based on at least one previously-determined coding parameter that has already been determined earlier according to the at least one request descriptor in common with the earlier request, wherein the coding parameter is determined according to at least one descriptor characterizing the request being processed and which is not in common with the earlier request, and wherein the at least one request descriptor in common with the earlier request comprises at least one of a characteristic of the second communication appliance, a characteristic of the communication network, and a preference of a user issuing the request in terms of presentation of the data.

2. A method according to claim 1, wherein the request being processed is designated as a similar request when the two requests have only certain request descriptors in common.

3. A method according to claim 2, wherein the request is designated as a similar request when the multimedia data requested in the request being processed and at least one other request descriptor are taken into account as common request descriptors, and wherein a descriptor of the current request comprises at least certain of the characteristics of the second communication appliance, and wherein the descriptor of the current request identifies the multimedia data to be transcoded and transmitted to the second communication appliance.

4. A method according to claim 1, wherein, when the request being processed is designated as a new request, the method includes a step of determining at least one coding parameter which will be used for transcoding the multimedia data prior to transmission, the at least one coding parameter being determined according to at least one descriptor characterizing the current request.

5. A method according to claim 1, wherein a characteristic of the request is the calculating capacity of the second communication appliance.

6. A method according to claim 1, wherein a characteristic of the request is the memory capacity available in the second communication appliance.

7. A method according to claim 1, wherein a descriptor of the current request comprises at least certain of the characteristics of the communication network.

8. A method according to claim 1, wherein a descriptor of the current request identifies the multimedia data to be supplied to the second communication appliance.

9. An information storage means readable by a computer or a microprocessor having code instructions of a computer program for executing steps of the method for transmitting transcoded multimedia data according to claim 1.

10. A computer-executable program that can be loaded into a programmable communication appliance, wherein said computer program has sequences of instructions or portions of software code for implementing the steps of the method for transmitting transcoded multimedia data according to claim 1, when this computer program is loaded and executed by the programmable communication appliance.

11. A method according to claim 1, wherein transcoding of the multimedia data comprises an adaptation of the multimedia data to the capabilities of the second communication appliance or to the capabilities of the communication network.

12. A method according to claim 11, wherein the adaptation comprises a reduction in the transmission rate.

13. A method according to claim 11, wherein the adaptation comprises a change in frame rate frequency of the multimedia data.

14. A method according to claim 11, wherein the adaptation comprises a change in resolution of the multimedia data.

15. A communication appliance for transmitting transcoded multimedia data to a second communication appliance via a communication network which connects the communication appliances, wherein the communication appliance comprises:
  receiving means for receiving from the second communication appliance a request for the multimedia data, wherein the request includes a number of descriptors characterizing the request;
  retrieving means for retrieving the multimedia data from a digital data storage unit which stores the multimedia data;
  determining means for determining a coding parameter for transcoding of the multimedia data, wherein the coding parameter is determined in accordance with the request;
  transcoding means for transcoding the retrieved multimedia data in accordance with the coding parameter; and
  transmitting means for transmitting the transcoded multimedia data to the second communication appliance;
  wherein the determining means comprises:
  analyzing means for analyzing the descriptors characterizing the request being processed;
  comparing means for comparing the result of the analysis with the descriptors of other requests processed earlier;
  designating means for designating, according to the result of the comparison, whether the request being processed is an identical request, a similar request, or a new request, wherein
    an identical request is identical to a request processed earlier, in the sense that the two requests have the same request descriptors;
    a similar request is similar to a request processed earlier, in the sense that the two requests have at least one request descriptor in common;
    a new request is new compared with the requests processed earlier,
  wherein, when the request being processed is designated as a similar request, the coding parameter is determined based on at least one previously-determined coding parameter that has already been determined earlier according to the at least one request descriptor in common with the earlier request, wherein the coding parameter is determined according to at least one descriptor characterizing the request being processed and which is not in common with the earlier request, and
  wherein the at least one request descriptor in common with the earlier request comprises at least one of a characteristic of the second communication appliance, a characteristic of the communication network, and a preference of a user issuing the request in terms of presentation of the data.

16. A communication appliance according to claim 15, wherein the request being processed is designated as a similar request when the two requests have only certain request descriptors in common.

17. A communication appliance according to claim 15, wherein when the request being processed is designated as a new request, the communication appliance includes determining means for determining at least one coding parameter which will be used for transcoding the multimedia data prior to transmission, the at least one coding parameter being determined according to at least one descriptor characterizing the current request.

18. A communication appliance according to claim 15, wherein transcoding of the multimedia data comprises an adaptation of the multimedia data to the capabilities of the second communication appliance or to the capabilities of the communication network.

19. A communication appliance according to claim 18, wherein the adaptation comprises a reduction in the transmission rate.

20. A communication appliance according to claim 18, wherein the adaptation comprises a change in frame rate frequency of the multimedia data.

21. A communication appliance according to claim 18, wherein the adaptation comprises a change in resolution of the multimedia data.

22. A method of transcoding multimedia digital data, based on a request for the multimedia data, the request having descriptors that each define at least one coding parameter for processing the request, the method comprising:
  comparing descriptors of the request with descriptors of an earlier request to determine common descriptors between the request and the earlier request;
  classifying the request based on the comparing, wherein the request is classified as identical to the earlier request when the request has the same descriptors as the earlier request, similar to the earlier request when the request and the earlier request have at least one common descriptor, or new when the request and the earlier request have no common descriptors;

determining the coding parameter in accordance with the classification of the request, wherein, when the request being processed is classified as a similar request, the coding parameter is determined according to at least one descriptor characterizing the request being processed and which is not in common with the earlier request; and transcoding the multimedia data in accordance with the coding parameter.

23. The method of claim 22, further comprising:

tracking a frequency of appearance of the request; and storing coded data associated with at least one coding parameter defined by a descriptor of the request when the frequency of appearance is above a predetermined threshold.

24. A device for transcoding multimedia digital data, based on a request for the multimedia data, the request having descriptors that each define at least one coding parameter for processing the request, comprising:

a processor;

a comparator adapted to compare descriptors of the request with descriptors of an earlier request to determine common descriptors between the request and the earlier request;

a classifier to classify the request based on the comparing, wherein the request is classified as identical to the earlier request when the request has the same descriptors as the earlier request, similar to the earlier request when the request and the earlier request have at least one common descriptor, or new when the request and the earlier request have no common descriptors;

a determiner to determine the coding parameter in accordance with the classification request, wherein, when the request being processed is classified as a similar request, the coding parameter is determined according to at least one descriptor characterizing the request being processed and which is not in common with the earlier request; and a transcoder to transcode the multimedia data in accordance with the coding parameter.

25. The device of claim 24, further comprising:

a counter adapted to track a frequency of appearance of the request; and a memory adapted to store coded data associated with at least one coding parameter defined by a descriptor of the request when the frequency of appearance is above a predetermined threshold.

26. A method for transmitting transcoded multimedia data from a first communication appliance to a second communication appliance via a communication network which connects the first and second communication appliances, wherein the method is performed in the first communication appliance and comprises:

receiving from the second communication appliance a request for the multimedia data, wherein the request includes a number of descriptors characterizing the request;

retrieving the multimedia data from a digital data storage unit which stores the multimedia data;

determining a coding parameter for transcoding of the multimedia data, wherein the coding parameter is determined in accordance with the request;

transcoding the retrieved multimedia data in accordance with the coding parameter; and transmitting the transcoded multimedia data to the second communication appliance;

wherein the step of determining a coding parameter comprises:

analyzing the descriptors characterizing the request being processed;

comparing the result of the analysis with the descriptors of other requests processed earlier;

according to the result of the comparison, designating whether the request being processed is an identical request, or a similar request or a new request, wherein an identical request is identical to a request processed earlier, in the sense that the two requests have the same request descriptors;

a similar request is similar to a request processed earlier, in the sense that the two requests have at least one request descriptor in common;

a new request is new compared with the requests processed earlier, wherein, when the request being processed is designated as a similar request, the coding parameter is determined based on at least one previously-determined coding parameter that has already been determined earlier according to the at least one request descriptor in common with the earlier request, wherein, when the request being processed is designated as an identical request, consideration is given to the coding parameter which was used for transcoding the multimedia data for the request processed earlier, and which has already been determined earlier according to at least certain of the descriptors characterizing the request being processed; and wherein the at least one request descriptor in common with the earlier request comprises at least one of a characteristic of the second communication appliance, a characteristic of the communication network, and a preference of a user issuing the request in terms of presentation of the data.

27. A communication appliance for transmitting transcoded multimedia data to a second communication appliance via a communication network which connects the communication appliances, wherein the communication appliance comprises:

receiving means for receiving from the second communication appliance a request for the multimedia data, wherein the request includes a number of descriptors characterizing the request;

retrieving means for retrieving the multimedia data from a digital data storage unit which stores the multimedia data;

determining means for determining a coding parameter for transcoding of the multimedia data, wherein the coding parameter is determined in accordance with the request;

transcoding means for transcoding the retrieved multimedia data in accordance with the coding parameter; and transmitting means for transmitting the transcoded multimedia data to the second communication appliance;

wherein the determining means comprises:

analyzing means for analyzing the descriptors characterizing the request being processed;

comparing means for comparing the result of the analysis with the descriptors of other requests processed earlier;

designating means for designating, according to the result of the comparison, whether the request being processed is an identical request, a similar request, or a new request, wherein an identical request is identical to a request processed earlier, in the sense that the two requests have the same request descriptors;

a similar request is similar to a request processed earlier, in the sense that the two requests have at least one request descriptor in common;

a new request is new compared with the requests processed earlier, wherein, when the request being processed is designated as a similar request, the coding parameter is determined based on at least one previously-determined coding parameter that has already been determined earlier according to the at least one request descriptor in common with the earlier request, wherein when the request being processed is designated as an identical request, consideration is given to the coding parameter which was used for transcoding the multimedia data for the request processed earlier, and which has already been determined earlier according to at least certain of the descriptors characterizing the request being processed, and wherein the at least one request descriptor in common with the earlier request comprises at least one of a characteristic of the second communication appliance, a characteristic of the communication network, and a preference of a user issuing the request in terms of presentation of the data.

28. A method according to claim 27, wherein the method includes a step of determining as regards knowing whether the current request has a frequency of appearance which is above a predetermined threshold.

29. A method according to claim 28, wherein, when the frequency of appearance of the current request is above the predetermined threshold, the method includes a subsequent step of storing the transcoded multimedia data with said at least one coding parameter determined earlier.

30. A method of transcoding multimedia digital data, based on a request for the multimedia data, the request having descriptors that each define at least one coding parameter for processing the request, the method comprising:

comparing descriptors of the request with descriptors of an earlier request to determine common descriptors between the request and the earlier request;

classifying the request based on the comparing, wherein the request is classified as identical to the earlier request when the request has the same descriptors as the earlier request, similar to the earlier request when the request and the earlier request have at least one common descriptor, or new when the request and the earlier request have no common descriptors;

determining the coding parameter in accordance with the classification of the request, wherein, when the request being processed is classified as an identical request, consideration is given to the coding parameter which was used for transcoding the multimedia data for the earlier request, and which has already been determined earlier according to at least certain of the descriptors characterizing the request being processed; and transcoding the multimedia data in accordance with the coding parameter.

31. A communication appliance according to claim 30, wherein communication appliance includes determining means for determining whether the current request has a frequency of appearance which is above a predetermined threshold.

32. A communication appliance according to claim 31, wherein said communication appliance includes storing means for storing the transcoded multimedia data with said at least one coding parameter determined earlier.

33. A device for transcoding multimedia digital data, based on a request for the multimedia data, the request having descriptors that each define at least one coding parameter for processing the request, comprising:

a comparator adapted to compare descriptors of the request with descriptors of an earlier request to determine common descriptors between the request and the earlier request;

a classifier to classify the request based on the comparing, wherein the request is classified as identical to the earlier request when the request has the same descriptors as the earlier request, similar to the earlier request when the request and the earlier request have at least one common descriptor, or new when the request and the earlier request have no common descriptors;

a determiner to determine the coding parameter in accordance with the classification request, wherein, when the request being processed is classified as an identical request, consideration is given to the coding parameter which was used for transcoding the multimedia data for the earlier request, and which has already been determined earlier according to at least certain of the descriptors characterizing the request being processed; and a transcoder to transcode the multimedia data in accordance with the coding parameter.

* * * * *